Nov. 9, 1943.  O. KYLIN  2,333,868
RELEASING TAP HOLDER
Filed Dec. 14, 1942

INVENTOR.
OSKAR KYLIN
BY
Haywood & Van Horn
his ATTORNEYS

Patented Nov. 9, 1943

2,333,868

UNITED STATES PATENT OFFICE 2,333,868

RELEASING TAP HOLDER

Oskar Kylin, Cleveland Heights, Ohio, assignor to Bardons and Oliver, Inc., Cleveland, Ohio, a corporation of Ohio Application December 14, 1942, Serial No. 469,029

1 Claim. (Cl. 10—89)

The present invention is an improvement in tap holders and relates more particularly to the type adapted for use on turret lathes or other machine tools.

It is one of the objects of my invention to provide a tap holder in which is embodied a sensitive release mechanism for releasing the tap in the holder when the tap reaches the end of its journey into the work piece to thereby permit the tap to rotate freely with the work and to prevent damage or destruction of the tap.

Another object of the invention is to provide a releasing tap holder of the above named character which is extremely simple in construction and positive in operation.

Another object consists in providing a tap holder of the releasing type which can be used with either right or left hand taps.

A further object of the invention is to provide means whereby the tap can easily be aligned with the opening in the work piece which is to be tapped.

A still further object is to provide a releasing tap holder which is automatic in its operation.

Other objects and advantages of my invention will become more apparent as the following description of one embodiment thereof progresses, reference being made to the accompanying drawing in which like reference characters are employed to designate like parts throughout the same.

Figure 1:
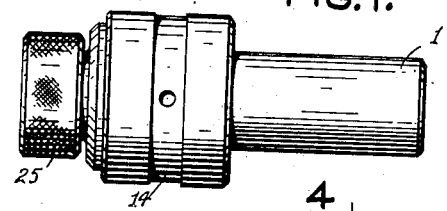
Figure 1 is a side elevation of a tap holder embodying my invention.
Figure 3:
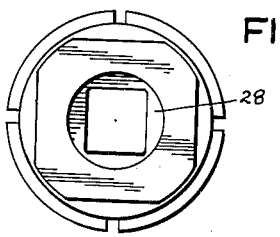
Figure 3 is a rear end view of the tap collet detail.

Referring now more specifically to the drawing, the embodiment illustrated is of the type which is adapted to be clamped in a turret head by means of a clamping belt operating against the shank 1 by which the unit is supported in the turret head. The tap is indicated at 2 and may be either a right or left handed tap as required for the operation on the work piece. The tap holder comprises essentially relatively rotatable parts and associated means for locking these parts against rotation during the tapping operation, but automatically permitting relative rotation instantly the tap has reached the limit of its travel in the work piece. The shank 1 terminates in a slightly enlarged head 3 having an opening or bore 4 extending transversely of the axis of the shank and terminating at one end in a reduced diameter as at 5. A releasable locking member 6 is slidable in the bore 4 and is normally thrust outwardly of the bore by means of a compression spring 7.

Figure 2:
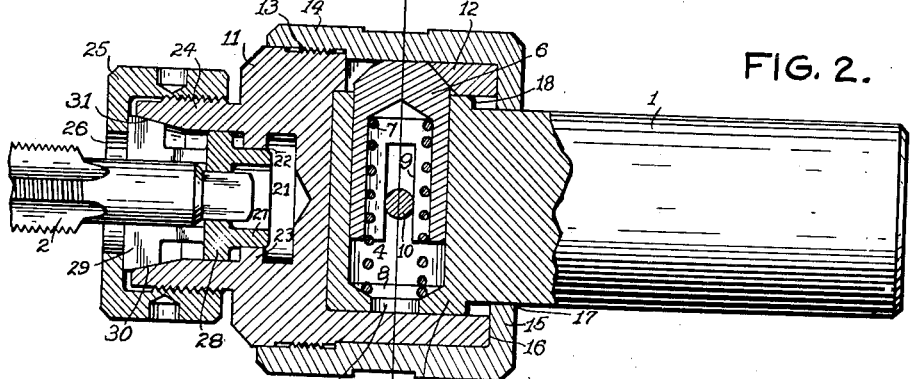
Figure 2 is a similar view slightly enlarged and partly broken away to illustrate the relative positions of the parts during a tapping operation and prior to the release of the tap for rotation with the work.

As shown in Figure 2, the spring 7 is disposed axially of the bore 4, one end of the spring abutting the lower inclined wall 8 of the bore which terminates in a smaller opening 5, while a portion of the spring extends within the hollowed portion of the locking member 6 to engage at its upper end with the head portion of the member. A slot 9 is formed in the side of the locking member and extends upwardly from the bottom open end thereof and is adapted to slidably receive the transverse guide pin 10 projecting radially inwardly from the head 3. It will be seen that the locking member 6 is movable radially of the axis of the shank and is urged in such movement in one direction by the action of the spring 7 while it is movable in the opposite direction against the compression of the spring. Movement of the locking member is restricted to a strictly radial direction in either case, rotative movement thereof being prevented by the guide pin 10 projecting within the slot 9. This is necessary due to the structure of the locking member external head portion and its functions and relation to other parts of the tap holder which will be described presently.

The tap 2 is removably clamped in a collet or chuck comprising a body 11 having a rearwardly extending cylindrical portion 12 which is adapted to receive the enlarged head 3 and locking member assembly. The outer wall is threaded at 13 to receive the threaded end of a sleeve 14. When the sleeve is in proper position on the body 11, its inturned annular flange 15 abuts the rear end of the cylinder as at 16. As will be seen from the drawing, the flange 15 is spaced slightly from the shank at 17 while the circumferential wall of the head 3 has sliding and rotational bearing engagement with the inner wall of the cylinder 12. The body 11 is limited in its axial movement on the head 3 by the flange 15 abutting the shoulder 18 of the head in one direction of movement and by the abutment of the outer end wall 19 of the head with the wall 20 of the body in the opposite direction.

The body 11 is relieved at 21 and has an axial opening 22 defined by the annular rib 23, the forward portion of the body extending outwardly in the form of an externally threaded receptacle 24. A clamping nut 25 having an axial opening 26 through which the tap projects, is threaded on the end of the member 24. In order that the shank of the tap may be rigidly supported and gripped in the body, I provide a gripping member comprising a cylindrical body 27 insertible in the opening 22 and having an annular outward flange 28 which rests upon the inner wall of the member 24. The forward end of the body 27 is formed with a plurality of resilient gripping fingers 29. The abutting walls 30 and 31 of the cylindrical member 24 and the fingers 29 respectively are inclined as shown in Figure 2 so that by turning the clamping nut 25 for axial movement to the right in Figure 2 the gripping member will move in the same direction into the opening 22. Such movement will cause the fingers to be forced inwardly radially into gripping engagement with the tap shank to thereby rigidly secure the tap in the holder.

In further carrying out my invention, it will be seen that I have provided means for preventing relative rotational movement between the body 11 gripping the tap and the shank of the tap holder which is clamped in a turret or holder during the tapping operation, and that I have further provided means for releasing the body 11 for rotational movement on the shank and head 1 and 3 respectively instantly upon a completion of the limit of travel of the tap into the work. It will be clear that as the tap is fed forwardly into a rotating work piece, the body 11 will be in a retracted position on the head 3, that is, it will be at its innermost position to the right in Figure 2. In such position the locking member 6 will be projected outwardly by the spring 7 into the opening 32 in the cylinder 12.

Figure 4:
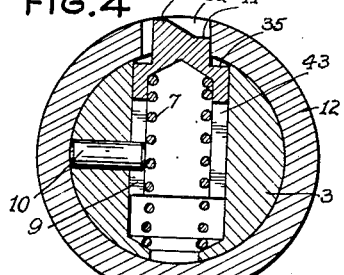
Figure 4 is a transverse section taken in the direction of line 4—4 of Figure 2, and illustrates the positions of the parts as the tap is performing its operation in a work piece.
Figure 6:
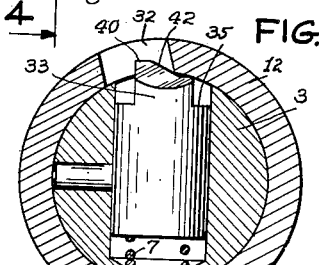
Figure 6 is a section similar to that in Figure 4, showing the positions of the parts as the tap approaches the end of its working travel.
Figure 8:
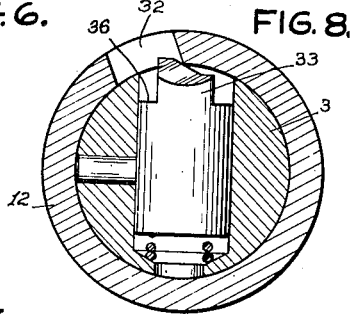
Figure 8 is a section similar to that of Figure 4, but shows the positions of the parts when the tap is released in the holder for rotation with the work.
Figure 5:
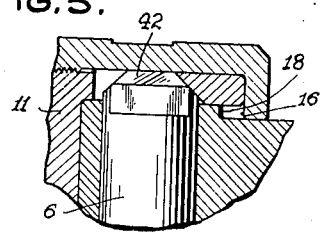
Figure 5 is a fragmentary view of the parts shown in Figure 4 as viewed in Figure 2.
Figure 7:
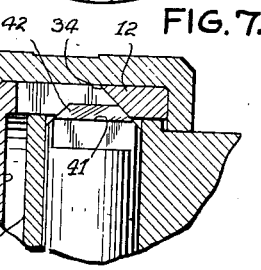
Figure 7 is a fragmentary view of the parts shown in Figure 6 as viewed in Figure 2.
Figure 9:
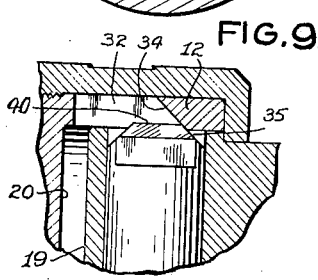
Figure 9 is a view similar to Figure 7.

The locking member 6 as illustrated in the drawing, comprises a body formed at its outer end with a projecting portion 33 which operates in the opening 32. The opening 32 is rectangular in shape, one wall being inclined inwardly away from the outer surface of the cylinder as indicated at 34 for sliding engagement with the inclined wall 35 of the projecting end of the locking member. In Figures 2, 5, 7 and 9 the locking member 6 is shown as viewed approximately 90° from the position as shown in Figures 4, 6 and 8.

Figure 10:
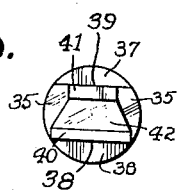
Figure 10 is a top view of the locking pin.

The projecting end of the locking member may be described as follows: As viewed in Figure 10 it will be seen that there are provided two flat horizontal surfaces 36 and 37 located at the base of the side walls 38 and 39 of the projecting end 33. Between the flat surfaces 36 and 37 the inclined walls 35 converge upwardly toward the top of the projecting end. A ledge 40 extends across one side of the projecting portion 33 while a second ledge 41 extends across an opposite side and substantially parallel to the ledge 40. These ledges are on different levels as seen clearly in Figures 4, 6, 8 and are connected by an inclined top wall 42. Under these conditions relative axial movement between the head 3 and the cylinder 12 from the positions shown in Figure 2 which occurs when the tap has reached its limit of travel in the piece will cause the locking member 6 to be retracted axially against the compression of the spring 9 since such movement will slidably engage the inclined wall 34 of the cylinder opening with the inclined wall 35 of the locking member to force the latter into the several positions shown in Figures 5, 7 and 9. Downward movement or retraction of the locking pin 6 in this manner will bring the ledge 41 to the position shown in Figures 6 and 8 to permit relative rotation between the head 3 and the cylinder 12.

Continued rotation of the cylinder 12 will bring the ledge 40 below the inner wall of the cylinder 12 and permit the latter together with the tap to rotate freely with the work piece. In this manner damage to the tap is prevented due to the automatic release of the same and relative rotation in its holders as the tap reaches its limit of travel in the piece. The compression of the spring 9 is such that it is readily overcome to permit a retraction movement of the locking member 6 as it approaches the end of its travel in the work piece. The pin 6 is fully retracted at the limit of travel or feed of the tap and thus prevents damage to the tap.

When a tap is employed for use in tapping a work piece in the opposite direction, it is only necessary to separate the chuck 11 and sleeve 14, manually depress the locking pin 6 to permit removal of the head 3 and shank 1 from the chuck body. The operator then removes the pin 6 upwardly through the opening in the cylinder 4 and rotates it approximately 180° in either direction and replaces it in the cylinder against the compression of the spring 7. In this position the guide pin 10 will operate in the slot 43 of the plunger 6. The tap holder is then reassembled and is ready for use.

Various changes may be made in the details of construction and arrangement of parts of my invention without departing from the spirit thereof or the scope of the appended claim.

I claim:

A tool holding device comprising in combination, a collet for holding the tool comprising a forward end portion having a polygonal axial opening and a rearwardly extending cylindrical portion, a holding device carried by the collet and having a polygonal shank fitting into said opening, said device having forwardly extending spring jaws for gripping a tool, means carried by the forward end of the collet and cooperating therewith for compressing said jaws, a headed shank extending into said cylindrical portion of the collet for relative rotational movement and limited axial movement therein, an outer member embracing the collet, its cylindrical portion and the headed portion of the shank, said cylindrical portion of the collet having a radial opening, the walls of the opening including a single wall inclined outwardly of the axis of the device, and releasable means carried by the headed portion of the shank and engageable with the walls of the said radial opening to prevent relative rotative movement between the head and the collet, said releasable means having an inclined wall slidably engageable with the inclined wall of said opening whereby the releasable means may be retracted to permit relative rotative movement between said collet and head portion.

OSKAR KYLIN.